United States Patent
Wang et al.

(10) Patent No.: US 9,753,878 B2
(45) Date of Patent: Sep. 5, 2017

(54) EXTENDING THE CAPABILITIES OF EXISTING DEVICES WITHOUT MAKING MODIFICATIONS TO THE EXISTING DEVICES

(75) Inventors: Randolph Y. Wang, Santa Clara, CA (US); Shaojun Wei, Beijing (CN); Leibo Liu, Beijing (CN); Eugene Tang, Beijing (CN); Jiqiang Song, Beijing (CN); Sun Chan, Fremont, CA (US); Dawei Wang, Beijing (CN); Jesse Fang, San Jose, CA (US); Paul Peng, Beijing (CN); Shouyi Yin, Beijing (CN)

(73) Assignee: Intel Corporation, Santa Clara, CA (US)

( * ) Notice: Subject to any disclaimer, the term of this patent is extended or adjusted under 35 U.S.C. 154(b) by 24 days.

(21) Appl. No.: 13/997,081

(22) PCT Filed: Nov. 2, 2011

(86) PCT No.: PCT/CN2011/081667
§ 371 (c)(1),
(2), (4) Date: Oct. 7, 2013

(87) PCT Pub. No.: WO2013/063769
PCT Pub. Date: May 10, 2013

(65) Prior Publication Data
US 2014/0101465 A1   Apr. 10, 2014

(51) Int. Cl.
*G06F 13/38* (2006.01)
*G06F 1/26* (2006.01)

(52) U.S. Cl.
CPC ............ *G06F 13/385* (2013.01); *G06F 1/266* (2013.01); *Y02B 60/1228* (2013.01); *Y02B 60/1235* (2013.01)

(58) Field of Classification Search
CPC ...... G06F 1/3203; G06F 3/0488; G06F 1/266; G06F 13/385
See application file for complete search history.

(56) References Cited

U.S. PATENT DOCUMENTS 6,047,342 A    4/2000 Depew
6,151,643 A *  11/2000 Cheng ..................... G06F 8/62
                                                    709/200

(Continued)

FOREIGN PATENT DOCUMENTS

CN         1841352 A     10/2006
WO     2013/063769 A1     5/2013

OTHER PUBLICATIONS

International Search Report and Written Opinion received for PCT application No. PCT/CN2011/081667 mailed on Aug. 9, 2012, 10 pages.

*Primary Examiner* — Thomas Lee
*Assistant Examiner* — Santosh R Poudel
(74) *Attorney, Agent, or Firm* — Jordan IP Law, LLC (57) ABSTRACT

A system of extending functionalities of a host device using a smart flash storage device comprises the host device having a host interface and configured to perform a specific function to generate a first set of data. The host device is coupled with a flash storage device. The flash storage device is configured to conform to a flash memory interface. A set of data generated by the host device is to be stored in flash memory storage of the flash storage device. A processor of the flash storage device is configured to run one or more user applications to process the set of data. The processor is to operate using power supplied by the host device.

23 Claims, 4 Drawing Sheets (56) References Cited

U.S. PATENT DOCUMENTS

| | | | |
|---|---|---|---|
| 7,286,836 B2* | 10/2007 | Emmerson | A63F 13/12 |
| | | | 455/456.2 |
| 7,958,191 B1* | 6/2011 | Nalam | H04L 67/025 |
| | | | 709/203 |
| 8,380,349 B1* | 2/2013 | Hickman | G05D 1/0246 |
| | | | 700/247 |
| 2002/0127019 A1* | 9/2002 | Ogasawara | 396/661 |
| 2003/0028699 A1 | 2/2003 | Holtzman et al. | |
| 2006/0039221 A1 | 2/2006 | Fukuda | |
| 2007/0085840 A1* | 4/2007 | Asaka | G06F 3/0488 |
| | | | 345/173 |
| 2007/0250564 A1* | 10/2007 | Chen | 709/203 |
| 2008/0228984 A1* | 9/2008 | Yu et al. | 710/308 |
| 2009/0222605 A1* | 9/2009 | Morozumi | 710/106 |
| 2010/0153595 A1* | 6/2010 | Sakuda et al. | 710/63 |
| 2010/0208299 A1* | 8/2010 | Sakuda | 358/1.15 |
| 2010/0217871 A1* | 8/2010 | Gammon | 709/227 |
| 2011/0105103 A1* | 5/2011 | Ullrich | G06F 3/017 |
| | | | 455/420 |
| 2011/0131660 A1* | 6/2011 | Claessen et al. | 726/26 |
| 2012/0110397 A1* | 5/2012 | Tanaka | G06F 13/4234 |
| | | | 714/54 |

* cited by examiner

EXTENDING THE CAPABILITIES OF EXISTING DEVICES WITHOUT MAKING MODIFICATIONS TO THE EXISTING DEVICES

BACKGROUND

Technical Field

Embodiments of the present invention generally relate to the field of data processing, and in some embodiments, specifically relate to extending capabilities of consumer electronic devices.

Discussion

Flash storage devices have become ubiquitous commodity components that are being utilized in a variety of consumer electronic devices. However, their functions are generally very limited.

BRIEF DESCRIPTION OF THE DRAWINGS

The multiple drawings refer to the embodiments of the invention. While embodiments of the invention described herein are subject to various modifications and alternative forms, specific embodiments thereof have been shown by way of example in the drawings and will herein be described in detail.

DETAILED DESCRIPTION

For some embodiments, methods and apparatuses of enabling storage devices such as flash storage devices to have more functions than the traditional storage functions are disclosed. The storage device may be configured to include a processor and a communication module coupled with the processor. Power can be supplied at least to the processor and the communication module by a host device associated with the storage device.

In the following description, numerous specific details are set forth, such as examples of specific data signals, components, connections, etc. in order to provide a thorough understanding of the various embodiments of the present invention. It will be apparent, however, to one skilled in the art that the embodiments of the present invention may be practiced without these specific details. In other instances, well known components or methods have not been described in detail but rather in block diagrams in order to avoid unnecessarily obscuring the embodiments of the present invention. Reference may be made to the accompanying drawings that form a part hereof, and in which it is shown by way of illustration specific embodiments in which the invention can be practiced. It is to be understood that other embodiments can be used and structural changes can be made without departing from the scope of the embodiments of this invention. As used herein, the terms "couple," "connect," and "attach" are interchangeable and include various forms of connecting one part to another either directly or indirectly. Also, it should be appreciated that one or more structural features described in one embodiment could be implemented in a different embodiment, even if not specifically mentioned as being a feature thereof. Thus, the specific details set forth are merely exemplary. The specific details may be varied from and still be contemplated to be within the spirit and scope of embodiments of the present invention.

Figure 1:
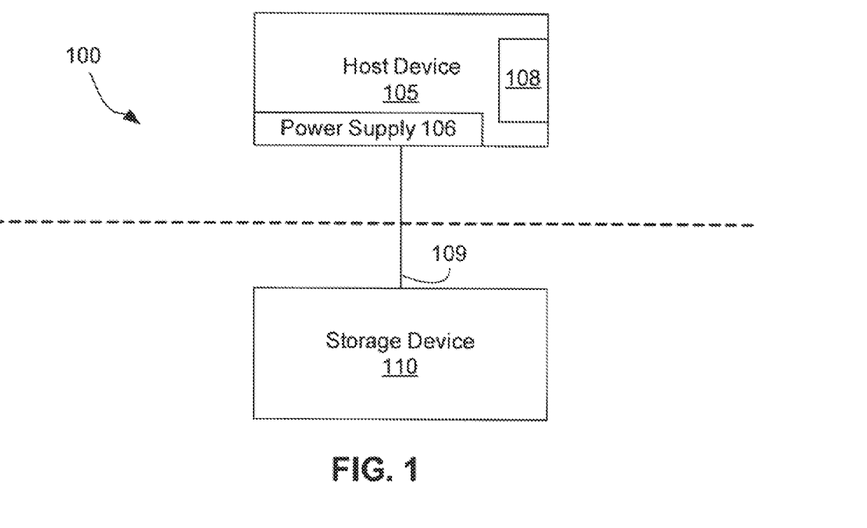
FIG. 1 is a diagram that illustrates an example system having a storage device, in accordance with some embodiments.

FIG. 1 is a diagram that illustrates an example system having a storage device, in accordance with some embodiments. A system 100 includes a host device 105 and storage device 110, in the example shown. The host device 105 may include power supply 106 which may be a battery or is associated with an electrical outlet. The host device 105 may also include a host interface 108 to communicate with the storage device 110 via a link 109. It may be noted that the link 109 is used to illustrate one possible connection between the host device 105 and the storage device 110. Other techniques to enable the connection of the host device 105 and the storage device 110 may also be used. For some embodiments, the host device 105 is a mobile device that is configured to perform a certain function. For example, the host device 105 may be a digital camera. The dotted line separating the host device 105 and the storage device 110 is meant to convey that they are separated devices, but the storage device 110 may be coupled with (or plugged into) the host device 105.

Figure 2:
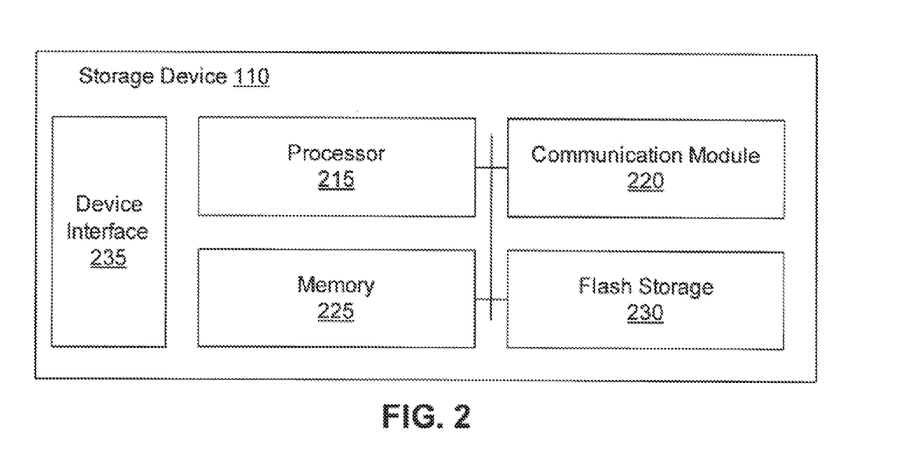
FIG. 2 is a block diagram that illustrates an example storage device, in accordance with some embodiments.
Figure 3:
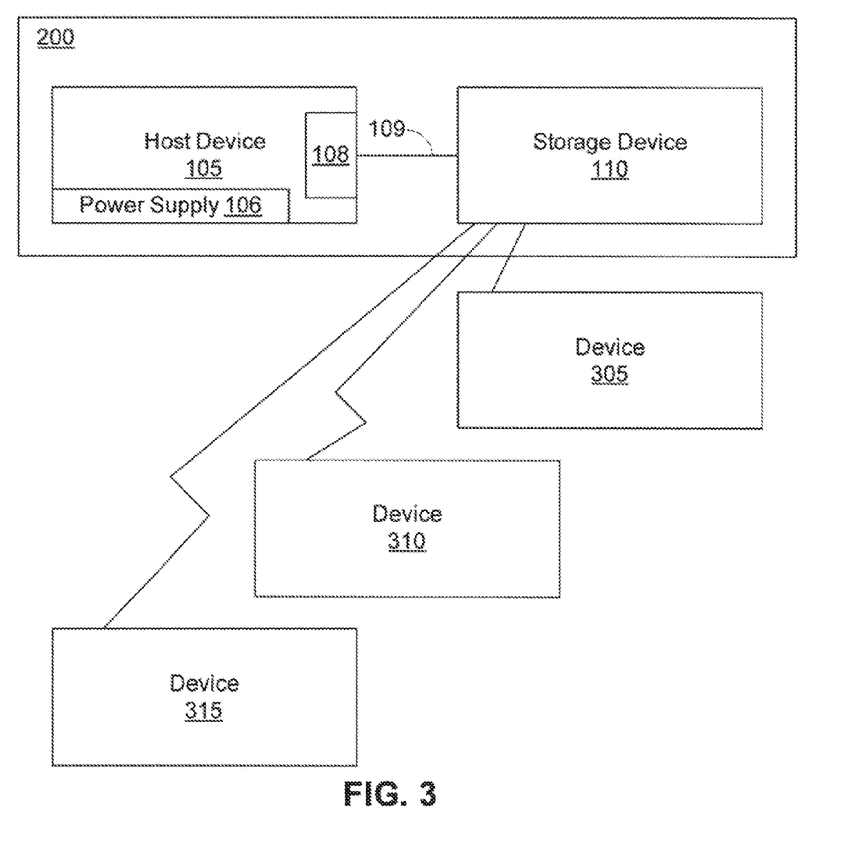
FIG. 3 is a block diagram that illustrates an example of a storage device exchanging its information, in accordance with some embodiments.

FIGS. 2 and 3 are block diagrams that illustrate an example system having a storage device, in accordance with some embodiments. A system 200 (inside the dotted lines) may include the storage device 110 and the host device 105. The storage device 110 may include a processor 215, a communication module 220, a memory 225, and flash storage 230. For some embodiments, the storage device 110 may be implemented using a form factor that is commonly used by flash storage devices such as, for example, a solid state (SD) card or a universal serial bus (USB, e.g., USB Specification 3.0, Rev. 1.0, Nov. 12, 2008, USB Implementers Forum) thumb drive. One advantage of using the flash memory form factor is that it contains no mechanical parts. As a result, data transfer to and from solid-state storage media may take place at a much higher speed than is possible with electromechanical disk drives. The absence of moving parts may translate into longer operating life, provided the devices are reasonably cared for and are not exposed to electrostatic discharge. However, as compared to electromechanical drives, the flash memory form factor may lag behind the electromechanical drives in terms of storage capacity. As an example, hard drives commonly hold hundreds of gigabytes (GB) whereas the flash memory USB devices may not be able to store as much. The cost per megabyte (MB) may be higher for solid-state storage devices than for electromechanical drives. However, the price gap appears to be narrowing, and the market for solid-state storage is may be growing. Many businesses and home users who have multiple computers may favor solid-state storage devices for transferring data among their machines, because it is convenient, compact, and fast.

The illustrated storage device 110 also includes device interface 235 to enable the storage device 110 to interface with the host device 105. For some embodiments, the device interface 235 is configured to conform to existing flash storage (file system) interface. Having the standard form factor and conforming to the existing storage interface may enable the storage device 110 to be used with a host device 105 from many different manufacturers. For some embodiments, the storage device 110 is configured to draw power from the host device 105 when the device interface 235 is coupled with the host interface 108. The power drawn from the host device 105 may be used to power at least the processor 215 and the communication module 220.

The flash storage 230 may be used as a local flash storage. For example, the host device 105 may be a digital camera and digital images captured by the host device 105 may be stored in the flash storage 230. The communication module 220 may be implemented to operate with a Wi-Fi (e.g., Institute of Electrical and Electronics Engineers/IEEE 802.11-2007, Wireless Local Area Network/LAN Medium Access Control (MAC) and Physical Layer (PHY) Specifications) network, cellular network (e.g., a "3G" network, a "4G" network) or any type of network that enables the storage device 110 to exchange information with other devices.

With continuing reference to FIGS. 1-3 a block diagram illustrates an example of a storage device exchanging its information, in accordance with some embodiments. The memory 225 of the storage device 110 may be used to store instructions associated with software applications that may be executed by the processor 215. The software applications may include an operating system (OS) for mobile environments (e.g., Android from Google, Inc. of Mountain View, Calif., WebOS from Hewlett-Packard Company of Cupertino, Calif., etc.), a communication application, and any other user applications that may be used to enable the storage device 110 to extend capabilities of the host device 105. For example, applications may be developed, downloaded and run on the storage device 110 to enable transmitting images stored in the flash storage 230 to other devices such as devices 305, 310 and 315.

The storage device 110 may not have a user interface. It may, however, support virtual device interface such as, for example, virtual network computing (VNC) via Wi-Fi, 3G, 4G, etc. VNC is software that makes it possible to view and interact with a computer from any other computer or device connected to the Internet. VNC is cross-platform, so a person using a Windows-based computer can connect to and interact with a UNIX system. For example, when the Android OS is used in the storage device 110, the standard Android graphical user interface (GUI) display may be seen in a VNC client running on some other devices. As another example, the storage device 110 may be configured to execute instructions associated with a web server, and users may interact with the web server in a way that is similar to how the Wi-Fi routers are configured using a Windows-based computer.

With continuing reference to FIGS. 1-4 is a network diagram that illustrates examples of using the storage devices in various applications, in accordance with some embodiments. A network 400 includes multiple connected devices, in the example shown. The network 400 may be the Internet. Connections from the devices to the network 400 may be wired, wireless, or any other types of connection. For some embodiments, the storage device 110 is configured to work with any host devices 105, including existing host devices without having to make any hardware or software modifications to the existing devices. The storage device 110 may remain plugged into the host device 105 for a prolonged period of time, while quietly executing user applications that have been downloaded into the storage device 110.

Figure 4:
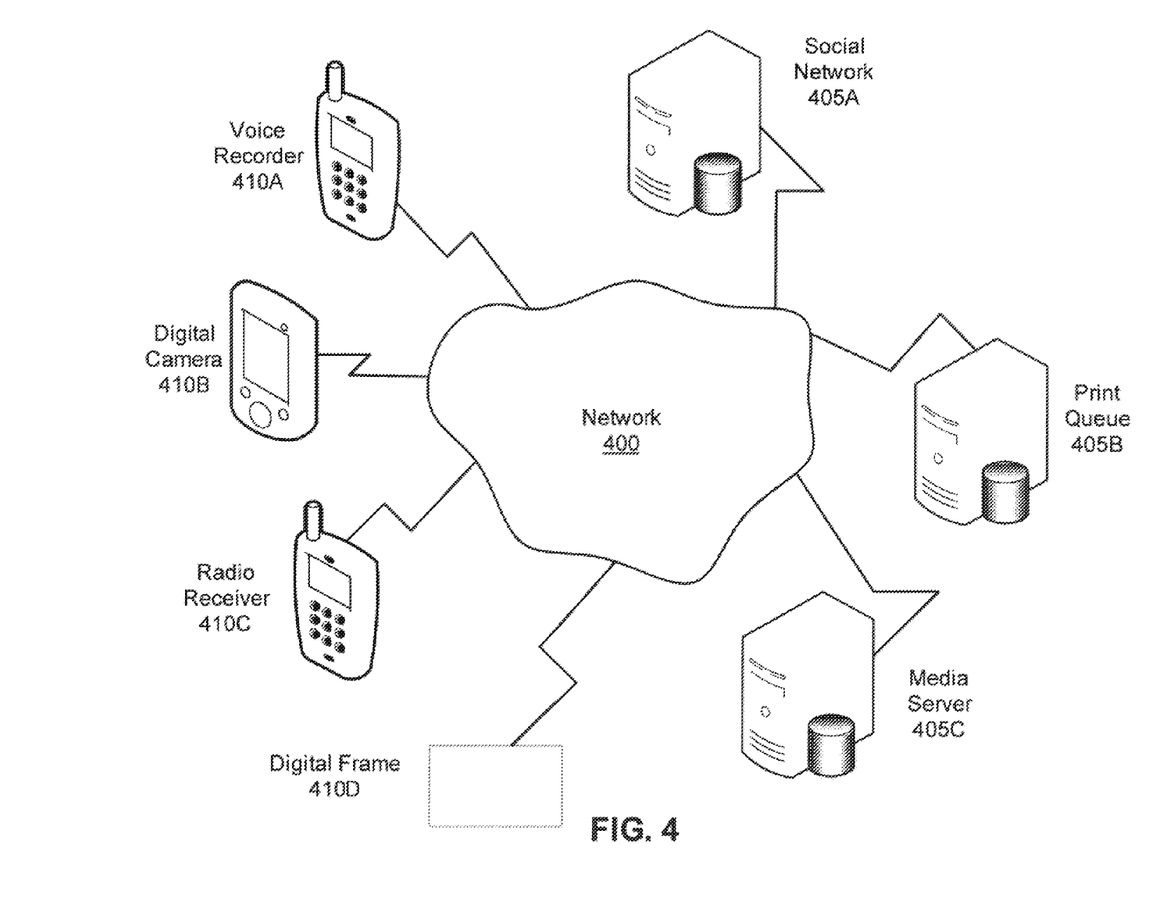
FIG. 4 is a network diagram that illustrates examples of using the storage devices in various applications, in accordance with some embodiments.

For example, a digital camera (or host device) 410B equipped with the storage device 110 may send images in real time to a digital photo frame 410D that is also equipped with a storage device such as the storage device 110. As another example, a voice recorder (or host device) 410A equipped with the storage device 110 may automatically send each new snippet of newly recorded voice to a "voice Twitter" social networking site. The voice recorder 410A may also perform automatic transcription and post the text to the Twitter social networking site 405A. As another example, a radio receiver (or host device) 410C that records daily programs may be programmed to deposit its recordings in a home media server 405C or upload it to a cloud-based service. Other examples include a pocket scanner (or host device) that writes its scanned files to the storage device 110 and may be programmed to send the scanned files to an e-reader, which may be similarly equipped with a storage device similar to the storage device 110, and a printer (or host device) that uses the storage device 110 as part of its print queue may easily implement an "email-to-print" feature.

The host devices used in the above examples may be referred to as "dumb" devices which normally would have limited functionalities. However, when pairing with the storage device 110, these "dumb" host devices have significantly more functionalities. For some embodiments, multiple storage devices 110 (together with their corresponding host devices 105) may be configured to work together as a federation to collaboratively perform a single task. This operating system of the storage devices 110 may be configured to recognize the collaboration in order to perform the task.

Having the storage device 110 configured with the features as described in FIG. 2 not only extends the capabilities of the host devices 105, but also enables the manufacturers of the host devices 105 to focus on developing host devices 105 for which they have expertise. For example, camera makers can focus on making cameras with excellent optics, which should be squarely within the camera makers' domain of expertise. These camera makers, on the other hand, may not necessarily be experts in developing social network applications that share images. The makers of the storage device 110 can focus on making low-power, low-cost, high-performance storage devices. Application developers can focus on developing new applications to run on the storage device 110 and extend the functionalities of a wide variety of host devices 105. These three groups of host device manufacturers, storage device manufacturers, and application developers may work independently of one another. For example, an application developed for a particular form of digital picture sharing may run on a storage device that can be plugged into multiple models of digital cameras.

For some embodiments, the user applications developed for the storage device 110 may be stored in cloud-based services associated with a partner. The user applications may then be downloaded to the storage device 110 based on a user of the corresponding host device 105 registering for the services of the cloud. In essence, the cloud-based services may be viewed as an application store for all of the applications developed for the storage device 110. In these scenarios, the local flash storage 230 may be used as a cache. As another example, the user applications may be coupled with network-based image hosting services such as Picasa of Google, Inc. of Mountain View, Calif. As another example, the user applications may be coupled with network-based video hosting services such as YouTube of Google, Inc. As another example, the user applications may be coupled with network-based document hosting services such as Google Docs of Google, Inc. There are many other applications that may be used with the storage device 110 using the services available from the cloud-based services and/or from the services connected to the Internet. For some embodiments, computational demands may be offloaded from the storage device 110 (and the processor 215) to server computing systems that are part of the cloud and/or connected to the Internet.

It should be noted that the storage device 110 described herein may be applicable for usage in many different types of consumer electronics. If any examples refer to the use of the storage device 110 in digital cameras or the like, they are only as examples and are not meant to be limiting to those applications. In other words, the storage device 110 may be used in any consumer electronics or host device) that are configured to accept flash memory using the common form factor such as the SD card or a USB thumb drive. Further, the storage device 110 described herein may be configured to operate with user developed applications that may be downloaded and executed by a processor on the storage device 110.

With continuing reference to FIGS. 1-5 is a flow diagram illustrates a process associated with using a storage device, in accordance with some embodiments. The process may start at block 505 where a storage device 110 is configured to operate with a host device 105. This may be based on the storage device 110 conforming to standard form factor such as a USB thumb drive and conforming to existing flash storage interface. The storage device 110 is configured with a processor 215. At block 510, user applications may be loaded into the storage device 110. The user applications may be downloaded from a user application store, from cloud-based application services, etc. The user applications may be stored in the memory 225 of the storage device 110 and instructions from these user applications may be executed by the processor 215. The memory 225 may also be configured to store an OS such as Android from Google, Inc. The OS may be loaded and executed by the processor 215. At block 515, the storage device 110 may be configured to operate using the power from the host device 105. That is, the storage device 110 may not have its own power supply. In alternative embodiments, the storage device 110 may have its own power supply in addition to or instead of drawing the power from the host device 105. At block 520, the storage device 110 may be configured to exchange data with other devices using a communication module of the storage device 110. This may include, for example, transmitting images and/or texts to social networks server computing systems connected to the Internet.

Figure 5:
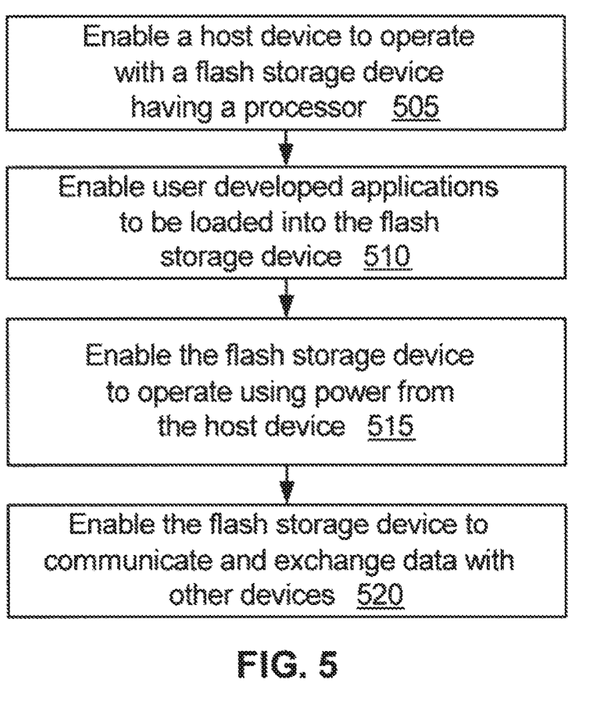
FIG. 5 is a flow diagram illustrating a process associated with using a storage device, in accordance with some embodiments.

The flow diagram may therefore be associated with a method for enabling a host device to operate with a flash storage device, wherein the flash storage device is configured to operate with its own processor and communication module. The method also includes enabling one or more user applications to be loaded into a memory of the flash storage device, enabling data generated by the host device to be stored in a flash memory storage of the flash storage device, and enabling the one or more user applications to be executed by the processor to process the data generated by the host device, wherein the processor is configured to operate using power supplied by the host device and not by the flash storage device.

Embodiments may also include a storage apparatus having a processor, and a memory module coupled with the processor and configured to store a mobile operating system and one or more user applications. The storage apparatus can also have a device interface configured to couple with an interface of a host device. The storage device can further include a storage module configured to store data associated with the host device, wherein at least the processor and the memory module are configured to operate using power supplied by the host device.

In addition, embodiments can include a system having a host device with a host interface and configured to perform a specific function to generate a first set of data. The system can also have a first storage device coupled with the host device and having a processor, flash memory storage, and a device interface conforming to a flash memory interface, wherein the first set of data generated by the host device is to be stored in the flash memory storage. The processor may be configured to run one or more user applications to process the first set of data. Additionally, the processor may be configured to operate using power supplied by the host device.

Other embodiments may include a computer readable storage medium having a set of instructions which, if executed by a processor, cause a flash storage device to enable a host device to operate with the flash storage device. The flash storage device may be configured to operate with the processor and a communication module. The set of instructions which, if executed by the processor, can further enable one or more user applications to be loaded into a memory of the flash storage device, enable data generated by the host device to be stored in a flash memory storage of the flash storage device, and enable the one or more user applications to be executed by the processor to process the data generated by the host device. Moreover, the processor may be configured to operate using power supplied by the host device and not by the flash storage device.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, specific examples are provided for shapes and materials; however, embodiments include those variations Obvious to a person skilled in the art, such as changing a shape or combining materials together. Further, while some specific embodiments of the invention have been shown the invention is not to be limited to these embodiments. For example, several specific modules have been shown. Each module performs a few specific functions. However, all of these functions could be grouped into one module or even broken down further into scores of modules. Most functions performed by electronic hardware components may be duplicated by software emulation and vice versa. The embodiments of the invention are to be understood as not limited by the specific embodiments described herein, but only by scope of the appended claims.

What is claimed is:

1. A storage apparatus comprising:
   a processor;
   a memory module coupled with the processor and configured to store a mobile operating system and one or more user applications;
   a communication module configured to enable communication with a network;
   a device interface configured to couple with an interface of a host device; and
   a storage module configured to store data associated with the host device,
   wherein at least the processor and the memory module are configured to operate using power supplied by the host device, wherein the one or more user applications are to be downloaded from partnered cloud-based services to the memory module based on a user of the host device registering for cloud-based services, and the cloud-based services are to be an application store for applications developed for the storage apparatus, and wherein the storage module is to extend capabilities of the host device by executing downloaded user applications that are configured to upload computational requirements of the host device to the cloud-based services via the communication module.

2. The apparatus of claim 1, wherein the device interface is a flash memory interface.

3. The apparatus of claim 1, wherein the communication module is further configured to transmit the data associated with the host device to another device connected to the network.

4. The apparatus of claim 3, wherein the one or more user applications are to be downloaded from an application store associated with the network.

5. The apparatus of claim 4, wherein the communication module is configured to operate using a wired or a wireless protocol.

6. The apparatus of claim 5, wherein the wireless protocol comprises one or more of cellular wireless protocols and Wi-Fi protocols, and wherein the host device is to be a consumer electronic device.

7. The apparatus of claim 1, wherein a virtual device interface is supported to enable using a client device to interact with the one or more user applications.

8. The apparatus of claim 1, wherein the memory module is configured to store a web server application to enable using a client device to interact with the one or more user applications.

9. A system comprising:
a host device having a host interface and configured to perform a specific function to generate a first set of data; and
a first storage device coupled with the host device and having a processor, a flash memory storage, a communication module configured to enable communication with a network, and a device interface conforming with a flash memory interface,
wherein the first set of data generated by the host device is to be stored in the flash memory storage,
wherein the processor is configured to run one or more user applications to process the first set of data,
wherein the processor is to operate using power supplied by the host device,
wherein the one or more user applications are to be downloaded from partnered cloud-based services to the flash memory storage based on a user of the host device registering for cloud-based services, and the cloud-based services are to be an application store for applications developed for the first storage device, and
wherein the flash memory storage is to extend capabilities of the host device by executing downloaded user applications that are configured to upload computational requirements of the host device to the cloud-based services via the communication module.

10. The system of claim 9, wherein the processor of the first storage device is configured to cause the first set of data to be transmitted to a first device communicatively connected with the first storage device.

11. The system of claim 10, wherein the host device is configured to generate a second set of data, wherein the second set of data is to be stored in the flash memory storage of the first storage device, and wherein the processor of the first storage device is configured to cause the second set of data to be transmitted to a second device communicatively connected with the first storage device.

12. The system of claim 11, wherein the communication module is to operate with the power supplied by the host device, and wherein the first device, the second device, and the first storage device are communicatively connected using wireless communication.

13. The system of claim 12, wherein the communication module is configured to enable the wireless communication including communication using a Wi-Fi network and communication using a cellular network.

14. The system of claim 9, wherein the first storage device is configured to have a flash memory form factor, and wherein the first storage device is configured to support a virtual device interface.

15. The system of claim 9, wherein the one or more user applications is stored in a memory of the first storage device, and wherein the one or more user applications is to be downloaded to the first storage device from a network.

16. The system of claim 15, wherein the one or more user applications is to be downloaded to the first storage device from a user application store connected to the network or from partnered cloud-based services.

17. The system of claim 9, further comprising a second storage device coupled with the host device, and wherein processing power of the second storage device is to be combined with processing power of the first storage device and are to be used to collaboratively process the first set of data.

18. A method comprising:
enabling a host device to operate with a flash storage device, wherein the flash storage device is configured to operate with its own processor and communication module;
enabling one or more user applications to be loaded into a memory of the flash storage device;
enabling data generated by the host device to be stored in a flash memory storage of the flash storage device; and
enabling the one or more user applications to be executed by the processor to process the data generated by the host device, wherein the processor is configured to operate using power supplied by the host device and not by the flash storage device,
wherein the one or more user applications are downloaded from partnered cloud-based services to the flash memory storage based on a user of the host device registering for cloud-based services, and the cloud-based services are an application store for applications developed for the flash storage device, and
wherein the flash storage device is to extend capabilities of the host device by executing downloaded user applications that are configured to upload computational requirements of the host device to the cloud-based services via the communication module.

19. The method of claim 18, further comprising enabling the flash storage device to transmit the data generated by the host device to another device using the communication module of the flash storage device, wherein the communication module is configured to operate using the power supplied by the host device.

20. The method of claim 18, wherein the one or more user applications is loaded into the memory of the flash storage device using the communication module, wherein the flash storage device is configured to couple with the host device using a flash memory interface, and wherein, based on using the flash storage device with the host device together with a flash storage device for each of a plurality of other host devices, the flash storage device of the host device and the flash storage device of each of the plurality of other host devices are able to form a federation to provide applications and services greater than the flash storage device and its host device can provide.

21. A non-transitory computer readable storage medium comprising a set of instructions which, if executed by a processor, cause a flash storage device to:
  enable a host device to operate with the flash storage device, wherein the flash storage device is to be configured to operate with the processor and a communication module;
  enable one or more user applications to be loaded into a memory of the flash storage device;
  enable data generated by the host device to be stored in a flash memory storage of the flash storage device; and
  enable the one or more user applications to be executed by the processor to process the data generated by the host device, wherein the processor is to be configured to operate using power supplied by the host device and not by the flash storage device,
  wherein the one or more user applications are to be downloaded from partnered cloud-based services to the flash memory storage based on a user of the host device registering for cloud-based services, and the cloud-based services are to be an application store for applications developed for the flash storage device, and
  wherein the flash storage device is to extend capabilities of the host device by executing downloaded user applications that are configured to upload computational requirements of the host device to the cloud-based services via the communication module.

22. The medium of claim 21, wherein the instructions, if executed, further cause the flash storage device to transmit the data generated by the host device to another device using the communication module of the flash storage device, wherein the communication module is to be configured to operate using the power supplied by the host device.

23. The medium of claim 21, wherein the one or more user applications is to be loaded into the memory of the flash storage device using the communication module, wherein the flash storage device is to be configured to couple with the host device using a flash memory interface, and wherein, based on using the flash storage device with the host device together with a flash storage device for each of a plurality of other host devices, the flash storage device of the host device and the flash storage device of each of the plurality of other host devices are to be able to form a federation to provide applications and services greater than the flash storage device and its host device can provide.

* * * * *